US012730292B2

(12) United States Patent
Arisaka et al.

(10) Patent No.: US 12,730,292 B2
(45) Date of Patent: Sep. 8, 2026

(54) TRANSVERSE SHEET ILLUMINATION MICROSCOPY(TranSIM)

(71) Applicant: THE REGENTS OF THE UNIVERSITY OF CALIFORNIA, Oakland, CA (US)

(72) Inventors: Katsushi Arisaka, Los Angeles, CA (US); Laurent A. Bentolila, Los Angeles, CA (US); Javier Carmona, Jr., Whittier, CA (US); Blake A. Madruga, Escondido, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 673 days.

(21) Appl. No.: 18/184,298

(22) Filed: Mar. 15, 2023

(65) Prior Publication Data

US 2023/0314781 A1 Oct. 5, 2023

Related U.S. Application Data

(63) Continuation of application No. PCT/US2021/050998, filed on Sep. 17, 2021.

(60) Provisional application No. 63/080,746, filed on Sep. 20, 2020.

(51) Int. Cl.
*G02B 21/00* (2006.01)
*G01N 21/64* (2006.01)

(52) U.S. Cl.
CPC ......... *G02B 21/0076* (2013.01); *G01N 21/64* (2013.01); *G02B 21/0032* (2013.01); *G02B 21/008* (2013.01)

(58) Field of Classification Search
CPC ........... G02B 21/0076; G02B 21/0032; G02B 21/008; G02B 21/00; G02B 21/0004; G02B 21/002; G02B 21/0024; G02B 21/0036; G02B 21/0048; G02B 21/0052; G02B 21/006; G02B 21/0068; G02B 21/06; G02B 21/36; G02B 21/361; G02B 21/365;
(Continued)

(56) References Cited

U.S. PATENT DOCUMENTS

| | | | |
|---|---|---|---|
| 4,997,281 | A | 3/1991 | Stark |
| 6,369,928 | B1 | 4/2002 | Mandella |
| 8,654,441 | B2 | 2/2014 | Jalali |

(Continued)

FOREIGN PATENT DOCUMENTS

| | | | |
|---|---|---|---|
| JP | 201191496 | A1 | 9/2011 |
| WO | 2011056658 | A1 | 5/2011 |

(Continued)

OTHER PUBLICATIONS

Arisaka, Katsushi, "Trans-Sheet Illumination Microscopy (Transim) for Decoding Whole Brain Activity at Submillisecond Temporal Resolution", University of Los Angeles, Research Portfolio Online Reporting Tools, Sep. 20, 2020, pp. 1-2.

(Continued)

*Primary Examiner* — Arnel C Lavarias
(74) *Attorney, Agent, or Firm* — O'BANION & RITCHEY LLP; John P. O'Banion

(57) ABSTRACT

Methods and apparatus for transverse sheet illuminated multiple plane imaging that can achieve simultaneous imaging of multiple z-planes in a laser scanning confocal fluorescence microscope.

11 Claims, 10 Drawing Sheets

(58) Field of Classification Search

CPC .. G02B 21/367; G01N 21/64; G01N 21/6456; G01N 21/6458; G01N 2021/6463; G01N 21/6486

USPC ....... 359/368, 362, 363, 369, 385, 386, 388, 359/390, 434, 435

See application file for complete search history.

(56) References Cited

U.S. PATENT DOCUMENTS

| | | | | |
|---|---|---|---|---|
| 9,810,896 | B2 * | 11/2017 | Nishiwaki ............ | H04N 13/239 |
| 10,746,981 | B2 * | 8/2020 | Tomer ................ | G02B 21/0076 |
| 2010/0202030 | A1 | 8/2010 | Cho | |
| 2011/0013114 | A1 | 1/2011 | Dunn | |
| 2013/0222801 | A1 | 8/2013 | Harel | |
| 2014/0139840 | A1 * | 5/2014 | Judkewitz .......... | G02B 21/0076 356/456 |
| 2017/0140913 | A1 | 5/2017 | Hitchcock | |
| 2019/0170646 | A1 * | 6/2019 | Fiolka ................ | G02B 21/0076 |
| 2019/0219811 | A1 | 7/2019 | Keller | |
| 2020/0182792 | A1 | 6/2020 | Vaziri | |

FOREIGN PATENT DOCUMENTS

| | | | |
|---|---|---|---|
| WO | 2019118433 | A1 | 6/2019 |
| WO | 2020063895 | A1 | 4/2020 |
| WO | 2022061191 | A1 | 3/2022 |

OTHER PUBLICATIONS

Arisaka, Katsushi, “Trans-Sheet Illumination Microscopy (TranSIM) for Decoding Whole Brain Activity at Submillisecond Temporal Resolution”, University of Los Angeles, Research Portfolio Online Reporting Tools, Sep. 20, 2020, pp. 1-3.

ISA/US, United States Patent and Trademark Office (USPTO), International Search Report and Written Opinion issued Feb. 9, 2022, related PCT international application No. PCT/US2021/050998, pp. 1-17, with claims searched, pp. 18-27.

Mohan, Kavya, et al., “Three Dimensional Fluorescence Imaging Using Multiple Light-Sheet Microscopy”, PLOS One, vol. 9, Issue 6, Jun. 2014, pp. 1-8.

Ziegler, Urs, et al., “ZMB Introduction to Confocal Laser Scanning Microscopy (LEICA)”, www.zmb.unizh.ch, pp. 1-87, 2023.

European Patent Office, European Extended Search Report issued Oct. 18, 2024, related European application No. 21870342.9, pp. 1-10, with claims searched, pp. 11-17.

* cited by examiner

TRANSVERSE SHEET ILLUMINATION MICROSCOPY(TranSIM)

CROSS-REFERENCE TO RELATED APPLICATIONS

This application claims priority to, and is a 35 U.S.C. § 111(a) continuation of, PCT international application number PCT/US2021/050998 filed on Sep. 17, 2021, incorporated herein by reference in its entirety, which claims priority to, and the benefit of, U.S. provisional patent application Ser. No. 63/080,746 filed on Sep. 20, 2020, incorporated herein by reference in its entirety. Priority is claimed to each of the foregoing applications.

The above-referenced PCT international application was published as PCT International Publication No. WO 2022/061191 A1 on Mar. 24, 2022, which publication is incorporated herein by reference in its entirety.

STATEMENT REGARDING FEDERALLY SPONSORED RESEARCH OR DEVELOPMENT

This invention was made with government support under Grant EY028395, awarded by the National Institutes of Health. The government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to confocal laser scanning microscopy, and more particularly to transilluminated multiple sheet microscopy techniques.

2. Background Discussion

Much of our efforts in understanding the functioning of the brain derives from mapping the "structural connectome" which only represents the static anatomical map of the entire circuitry of the brain. While imaging techniques like optical and electron microscopies can reveal high-spatial resolution maps of large populations of neurons in vivo, they lack the requisite temporal resolution that would allow detection of neuronal firing patterns. As a result, single-electrode voltage-clamp recording has remained the method of choice to study the neurophysiological dynamic activities of individual neurons in the millisecond time range in vivo. However, electrophysiology provides little to no spatial information.

BRIEF SUMMARY

This disclosure describes methods and apparatus for axially illuminated multiple plane imaging that can achieve simultaneous imaging of multiple z-planes in a laser scanning confocal fluorescence microscope. Conventional confocal microscopes operate by scanning a single plane and then translating scanner to scan a new plane. Typically the maximum volume depth is on the order of about 10 volumes per second.

In contrast, a microscope configured according to the technology described in this disclosure can stably scan on the order of 200 volumes per second. We refer to this new technology as "TranSIM" or "Transverse Sheet Illumination Microscopy". A "TranSIM" microscope is an axially illuminated microscope for multiple plane imaging that can achieve simultaneous imaging of multiple z-planes in a laser scanning confocal fluorescence microscope.

TranSIM provides a highly customizable single objective microscopy technique. TranSIM is suitable for many applications and particularly suited for biological samples where confocal microscopy is most widely used. The system can also be configured into a box system which can be adjusted and customized to any sensor including array sensors and line sensors. The ideal depth range for the system is also limited by the objective's ability to retain plane flatness at significant depth changes from the central plane.

TranSIM orients a transverse beam along the z-axis which rapidly collects high-resolution images up to about 100 times faster than any existing 3D scanning microscope. This innovative technology is particularly suited to observing brain-wide neurodynamics with about 1 μm spatial resolution in 3D, together with a millisecond temporal resolution that is only achievable today by electrophysiology.

In one embodiment TranSIM illuminates several planes by spatially separating multiple beams in depth (Z) and laterally (Y) so that the planes can then be separated. In one embodiment, TranSIM can select one plane a time and remaps them to be adjacent and in the same place on focus once it reaches the sensor. This increases the temporal resolution of confocal microscopy to the temporal resolution of a single plane. The number of planes that can be remapped to a single sensor is only limited by the physical sizes of the sensor itself since the planes are remapped adjacently.

In one embodiment, TranSIM can achieve micron-level resolution (about 0.7 μm, about 1.1 μm, and about 1.6 μm in the X, Y, and Z planes, respectively) in large three dimensional volumes (about 460 μm×about 750 μm×about 160 μm), and near millisecond temporal resolution (about 5 ms), by imaging nine planes simultaneously using three sCMOS cameras.

In a further embodiment, the complexity and size of TranSIM are reduced by simplifying the multiplexing mechanism using one camera instead of three cameras. Instead of a large circular optical cycle associated with three cameras, a linear reflection cavity is employed whereby each round trip in the cavity allows for an additional plane to be segmented and re-adjusted onto the sensor.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

In the following description we present a new technology that we call Transverse-Sheet Illumination Microscopy (TranSIM). This technology can achieve both high-spatial and high-temporal resolution simultaneously and is well-suited suited for many applications including brain imaging and imaging genetically expressed voltage-sensitive fluorescent markers. TranSIM closes the gap between spatial and temporal observation through innovative 3D optical scanning concepts that rival the temporal resolution of electrophysiology.

By way of example, and not of limitation, TranSIM provides an axially illuminated microscope for multiple plane imaging that can achieve simultaneous imaging of multiple z-planes in laser scanning confocal fluorescence microscopy. For example, by illuminating several planes by spatially separating multiple beams in depth (Z) and laterally (Y), the planes can then be separated. TranSIM can select one plane a time and remap the plane to be adjacent and in the same place on focus once it reaches the sensor. This increases the temporal resolution of confocal microscopy to the temporal resolution of a single plane. The number of planes that can be remapped to a single sensor is only limited by the physical size of the sensor itself since the planes are remapped adjacently.

In one embodiment, TranSIM separates the planes using a knife edge mirror to slice a new plane each cycle and have it remapped onto a sensor (e.g., sCMOS) adjacently to utilize the electric shutter of the camera for confocal imaging. With this design, the limiting scanning rate is dictated by the sensor itself since virtually and unlimited number of planes can be sliced away in depth.

A. Three-Camera Configuration

Figure 1:
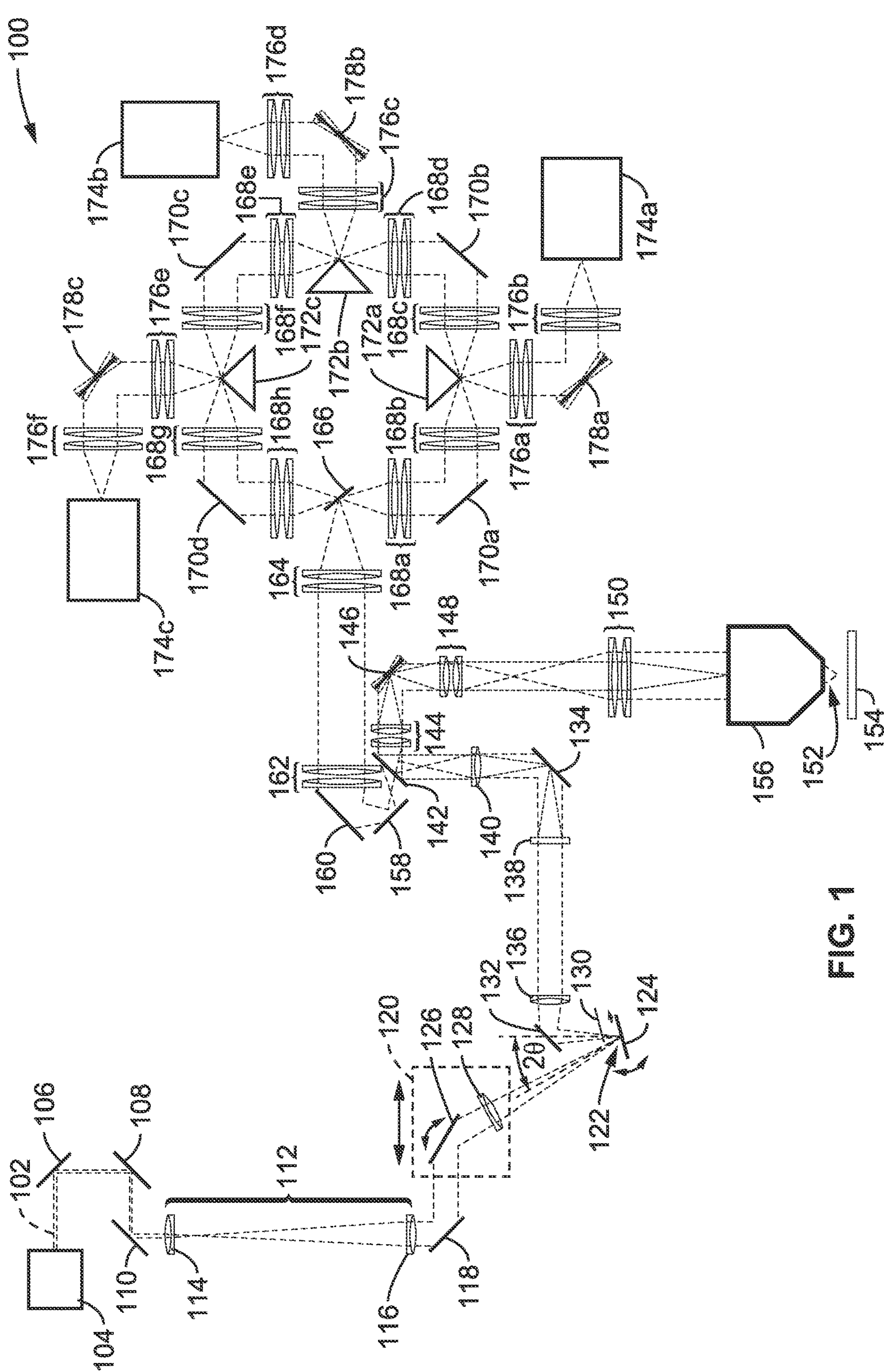
FIG. 1 is a schematic diagram of an embodiment of a three-camera transverse sheet illumination microscope according to the presented technology.
Figure 2:
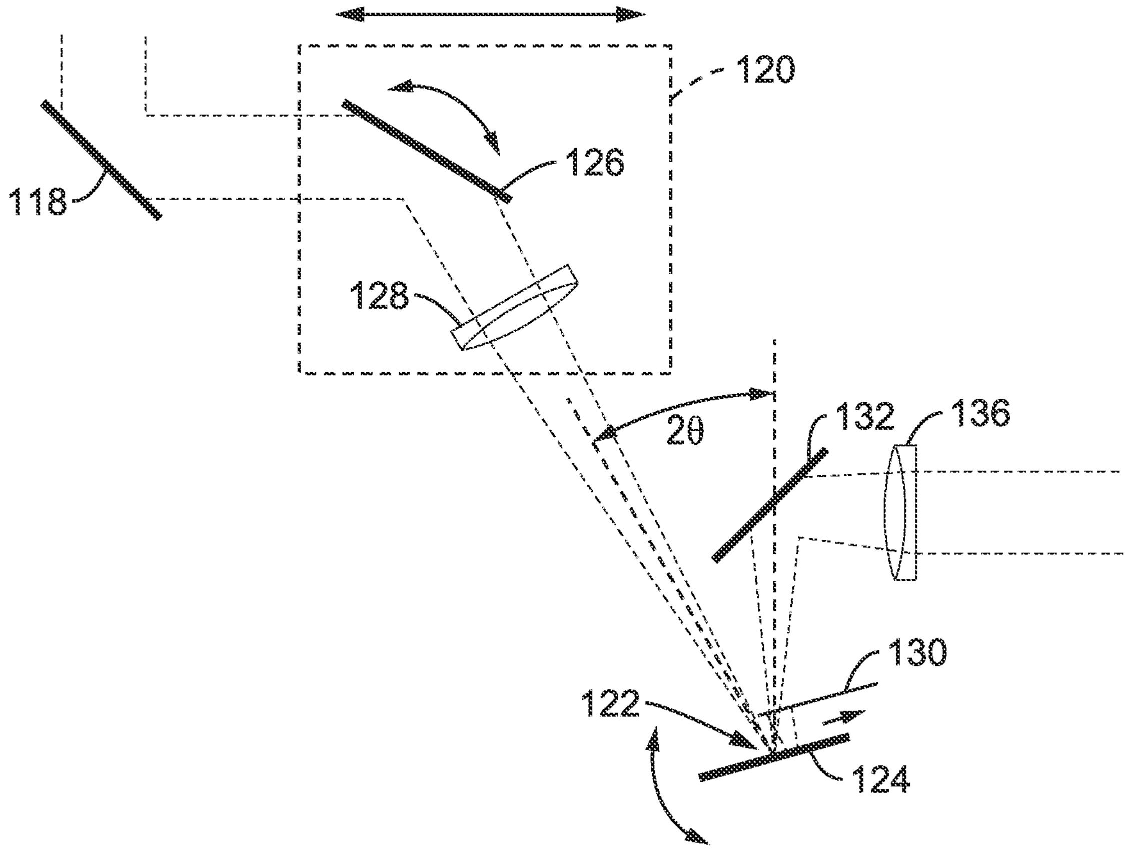
FIG. 2 is an enlarged schematic diagram of a portion of the illumination configuration shown in FIG. 1.

Referring now to FIG. 1, an embodiment 100 of a TransSIM microscope in a three-camera configuration is illustrated schematically. FIG. 2 is an enlarged schematic illustration of a portion of the illumination beam multiplexing configuration employed in FIG. 1. It will be appreciated that the three-camera configuration is fully functional but the large size may not be practical for all applications. A more compact one-camera configuration is described later in this disclosure. Accordingly, TranSIM can be applied to any number of sensors (e.g., cameras) N where N≥1. The plane separation cycle is N+1 so that, in a two-camera version, the plane separation cycle would be triangular, square in a three-camera version (see, e.g., FIG. 1), pentagonal in a four-camera configuration, and hexagonal in a five-camera configuration, etc. Accordingly, the imaging unit employs one or more plane separators and associated imaging sensor (s). As will be seen, the plane separation cycle the three-camera configuration that will now be described is square.

In the configuration 100 illustrated in FIG. 1, illumination is provided by an optical beam 102 from an excitation laser 104, shown here as a 488 nm laser, that is directed by a series of turning mirrors 106, 108, 110 and then expanded about 10× using a telescope beam expander 112 comprising spherical doublets 114, 116 (e.g., 25 mm and 250 mm, respectively). The beam is expanded from its original 1/e Gaussian profile to 10/e, approximately 10 mm full width at half maximum (FWHM). To create multi-focal plane scanning laser lines, the expanded beam is directed by a turning mirror 118 to a condenser unit 120 which condenses the beam down to a laser line 122 and diverts it to a depth reflection mirror 124 with angle 2-theta (26). In this embodiment, the condenser unit comprises an adjustable deflection mirror 126 in combination with a cylindrical lens 128 (e.g., 200 mm).

Referring also to FIG. 2, the depth reflection mirror 126 reflects the laser line 122 onto a beamsplitter 130 which, in this example, is a 90:10 Reflection:Transmission beamsplitter that allows X transmission and Y reflection. Upon reflection, the beam divergence creates an axial separation added to each subsequent reflected beam. In addition, the angle of incidence adds a lateral translation to each multiplexed beam. The reflection cycle repeats and each subsequent reflection produces a laser line with a focal place that is axially and laterally displaced. By spatially separating Gaussian line beams to illuminated separate planes, the planes can then be descanned with the same galvo scanner used to scan and then sent through the beam separation cycle. By multiplexing illumination single laser lines and laterally and axially separating them, the detection can be parallelized.

After reflection by a turning mirror 132, the multiplexed beams are relayed to a turning mirror 134 through a pair of cylindrical lenses 136, 138 (200 mm and about 100 mm, respectively). The size of cylindrical lens 138 is chosen to expand the beam according to the width of the imaging field. A spherical lens 140 (e.g., 100 mm) determines the numerical aperture (NA) of the excitation. Using a long pass dichroic mirror 142, the beam is diverted to a telecentric lens 144 formed using a pair of spherical doublet (e.g., 200 mm) and onto a galvanometer optical scanner 146 (Galvo). Similarly, the Galvo 146 scans onto a telecentric scan lens 148 formed using a pair of spherical doublet lenses with effective focal length (EFL) of about 100 mm in this example. The beam then passes through a telecentric tube lens is formed using a pair of spherical doublet lenses 150*a*, 150*b* (e.g., 400 nm). The resultant excitation beam 152 illuminates the sample 154 through an objective 156 (e.g., Nikon 16×0.8 NA 3 mm WD water immersion objective).

Fluorescence from the sample returns via the same pathway, where it is de-scanned by the Galvo 146 and redirected by turning mirrors 158, 160. Telecentric lenses 162 (e.g., 400 nm doublet pairs) and 164 (e.g., 300 mm doublet pairs) are used as the primary magnification lens pairs. Focusing the image field onto a D-shaped mirror 166, the fluorescence is injected into the imaging cycle that will consequently separate and remap the image planes onto the sensors (e.g., Hamamatsu Flash 4.0 v2 cameras).

To relay the image field, a pair 168*a*, 168*b* of identical telecentric lenses (e.g., two 200 mm spherical doublet pairs) and a turning mirror 170*a* are configured into a 90 degree turn. A knife-edge mirror 172*a* is then moved into proximity of the first imaging plane and is diverted into the imaging sensor pathway. Before reaching the sCMOS sensor 174*a*, the image plane is adjusted for magnification using telecentric lenses 176*a*, 176*b*, respectively (e.g., 100 mm effective focal length (EFL)) and rescanned using a Galvo 178*a* temporally synchronized with the primary scanning Galvo 146.

Additional planes move onto the next knife-edge mirror 172*b* where the adjacent image plane is diverted to the second sCMOS sensor 174*b*. Likewise, for the third image plane. After the first cycle is nearly complete, the remaining image field is adjusted using the last telecentric unit 168*g*, 168*h*, 170*d*, such that it is depth refocused to be on top of the first image plane and laterally adjacent. The cycle continues and each camera images the appropriate number of planes (three planes per camera in this configuration for a total of nine planes).

Figure 3A:
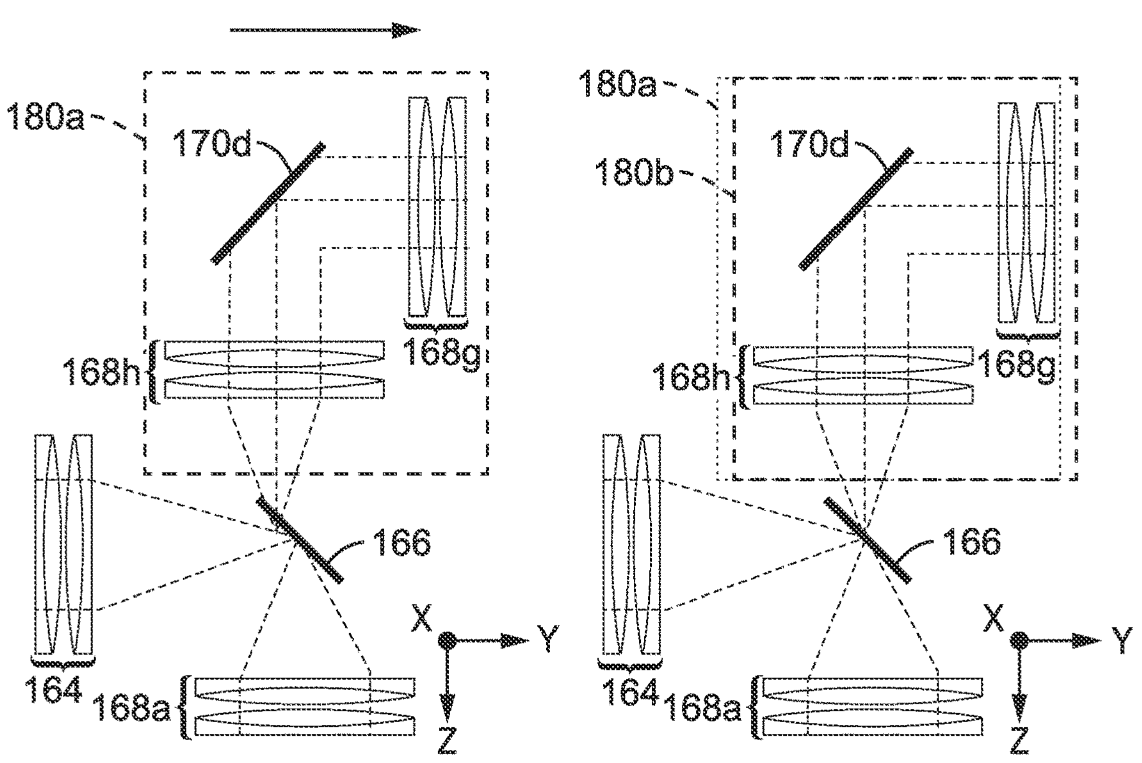
FIG. 3A and FIG. 3B are schematic diagrams illustrating an embodiment of an end of cycle readjustment process according to the presented technology.
Figure 3B:
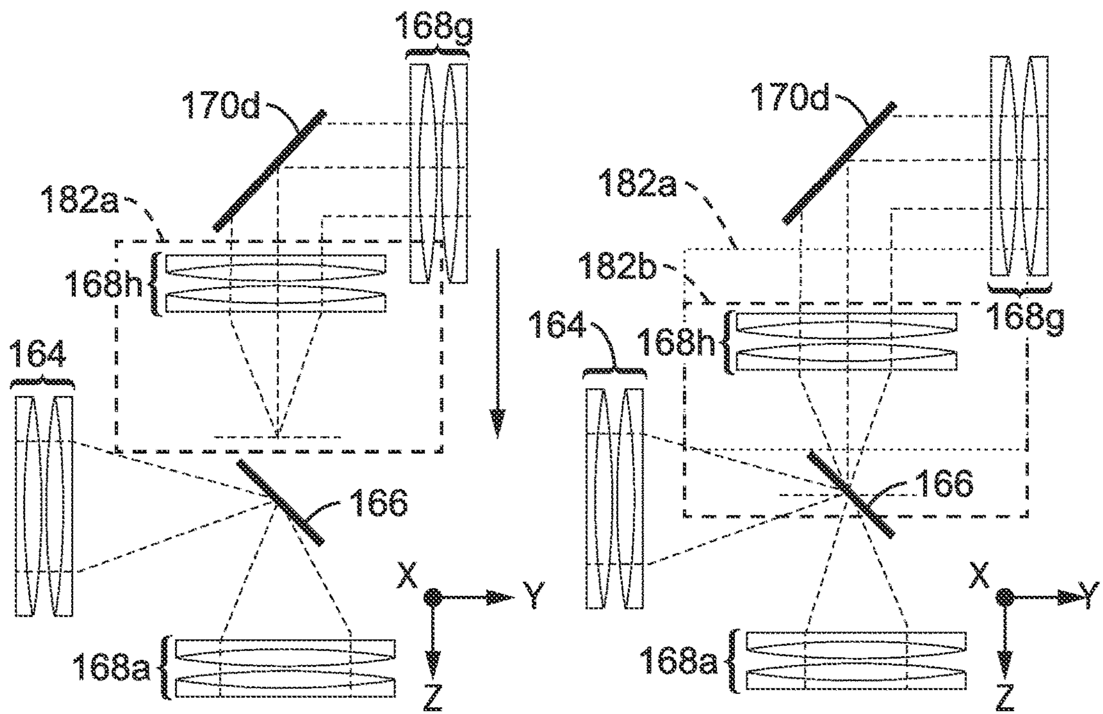

FIG. 3A and FIG. 3B schematically illustrate an end of cycle readjustment process according to an embodiment of TransSIM. After the first cycle, the image field returns to the same location as when it started the cycle. Using the last telecentric unit, the planes can be refocused axially and readjusted laterally to remap the adjacently the previous cycle. For example, the left side of FIG. 3A shows that the beam is offset laterally (in Y-dimension) to the left. As shown in the right side of FIG. 3A, the beam can be realigned by moving the telecentric unit uniformly to the right from a first position 180*a* to a second position 180*b* until the image field returns to a centered position as if the first of the remaining image planes were the first true image plane. Similarly, to move offset in the X-dimension, such that the planes pass underneath the D-shaped mirror, the telecentric relay unit is moved uniformly until there is enough clearance. For depth, FIG. 3B shows that only the last telecentric lens needs to be adjusted from a first position 182*a* to a second position 182*b* such that the image planes are focused to overlap the planes the planes of the previous cycle.

It will be appreciated that the illumination configuration described above can be viewed as a "unit" or "module" and can be used with other imaging configurations. Furthermore, the imaging configuration described above can be viewed as a "unit" or "module" and can be used with other illumination configurations. Additionally, the components, types, dimensions and other parameters described above are by way of example and not of limitation.

Example

Using the configuration of FIG. 1, we demonstrated the feasibility of TranSIM concept by imaging simultaneously nine separate planes in a live zebrafish. Each of the planes were spaced 10 μm apart for a combined rate of two hundred volumes per second. The image planes were recorded on three sCMOS sensors, three image planes per sensor to maximize sensor utilization, at 682 pixels×460 pixels per plane. Our illumination configuration used a multiplexed dual colliding Gaussian beam for improved photon efficiency and less inter-planar cross talk. We imaged the heart of a 5 dpf zebrafish and three to six chambers were visible in addition to blood flow. We also imaged the forebrain of a 4 dpf zebrafish which shows highly dynamic neuronal networks. In addition, we detected 100 ms brain wave phase shifts and determined that there was signal propagation in correlated neurons in both upward and downward manner.

B. One-Camera Configuration

Figure 4:
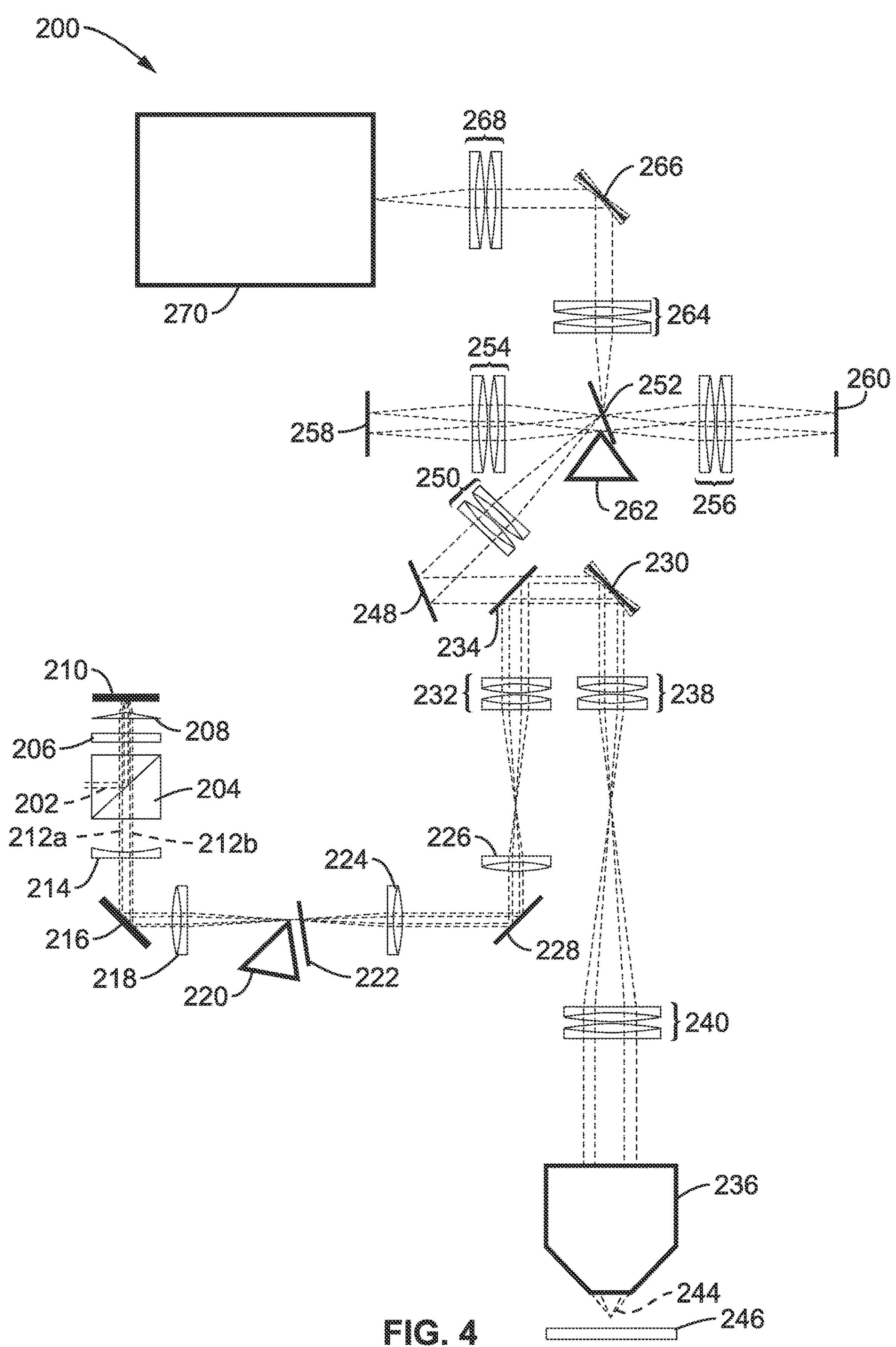
FIG. 4 is a schematic diagram of an embodiment of a one-camera transverse sheet illumination microscope according to the presented technology.
Figure 5:
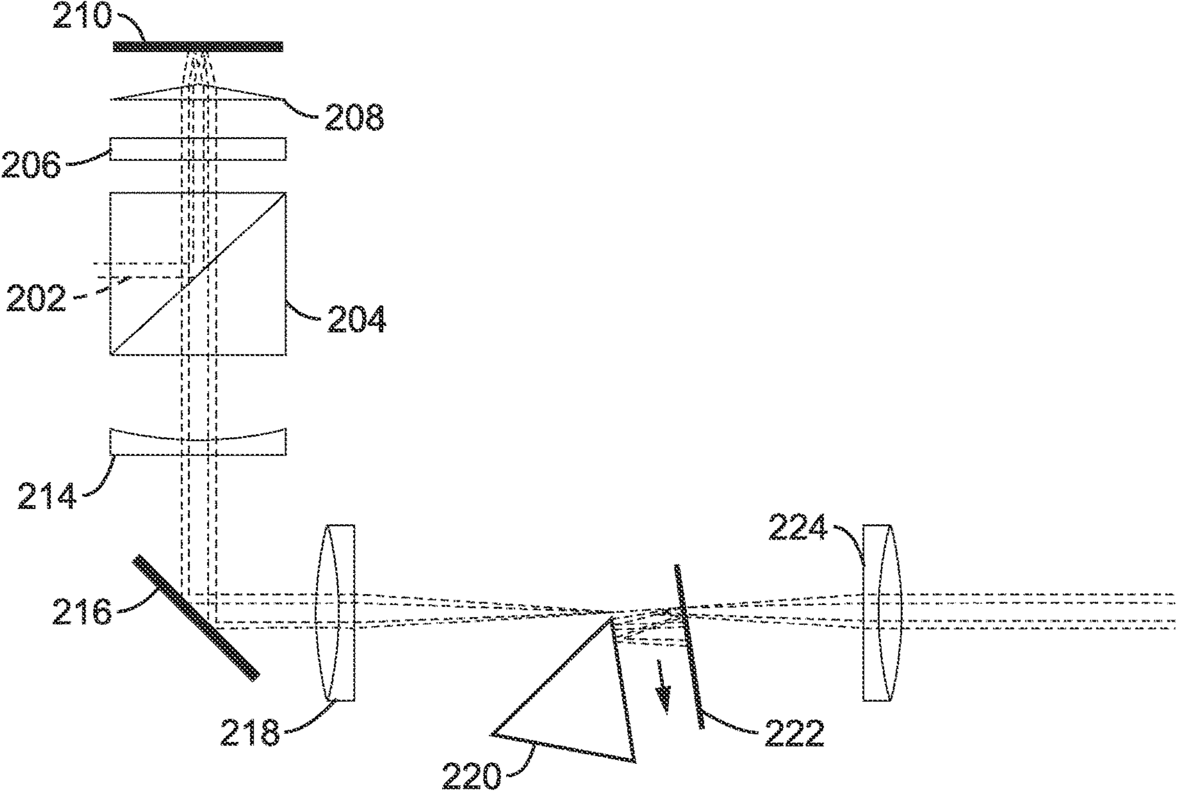
FIG. 5 is a schematic diagram of an alternative embodiment of an illumination configuration according to the presented technology.

FIG. 4 schematically illustrates an embodiment 200 of a TranSIM microscope in a one-camera configuration and FIG. 5 schematically illustrates an associated double Gaussian illumination configuration. TranSIM can be configured with any number of sensors, N, where N≥1. In the one-camera configuration the plane separation takes place in a linear reflector. Plane separation cycle is N+1 so that, in a two-camera version, the plane separation cycle would be triangular, square in a three-camera version (see, e.g., FIG. 1), pentagonal in a four-camera configuration, and hexagonal in a five-camera configuration, etc. Accordingly, the imaging unit employs one or more plane separators and associated imaging sensor(s).

Note also that the one-camera embodiment of FIG. 4 is illustrated as using a double Gaussian illumination configuration wherein, in order to create a more photon efficient illumination profile, the single Gaussian beam is split into two parallel beams. Those beams are then multiplexed using a forward multiplexing variant of the illumination configuration shown in FIG. 1 and FIG. 2. It will be noted, however, that the one-camera embodiment can also use the illumination configuration of FIG. 1 and FIG. 2, and that other illumination configurations can be used as well.

In the embodiment illustrated, illumination is provided by a laser source (e.g., 488 nm) that is split into two parallel beams to create a dual Gaussian colliding schema for improved efficiency at the sample. The incoming vertically polarized 488 nm laser beam 202 is reflected using a polarizing beamsplitter (PBS) 204. The polarization is circularized using a λ/4 wave-plate 206, and split using a Fresnel biprism (FPB) 208 which is then reflected back using a mirror 210 (e.g., NA mirror) to adjust the separation between the split beams 212*a*, 212b. Upon return, the λ/4 wave-plate linearly polarizes the beam in a horizontal manner which allows the beams to pass through the PBS 204. A plano-concave cylindrical lens 214 expands the beams in the x-dimension, the beams are redirected by a turning mirror 216, and the beams are focused down through a condensing lens 218 to a line at the depth mirror 220 and 90:10 beamsplitter 222, where the beams are multiplexed ad-infinitum, each new laser line being laterally and axially displaced dependent on the depth mirror's angle of incidence. The multiplexed beams are relayed and condensed using a pair of plano-convex cylindrical lenses 224, 226 and a turning mirror 228. The beams are further relayed to a scan Galvo 230 using a telecentric lens 232 and longpass dichroic mirror 234. The beams are scanned by the Galvo 230 and relayed to the back focal plane of the objective 236 using a 2:1 focal length telecentric scan lens 238 and tube lens 240 pair for final magnification. The multiplexed beams 242 are scanned at the focal plane, where they illuminate the sample 244 in discrete line scanned planes.

Fluorescence from the sample returns through the objective 236, tube lens 240, and scan lens 238, where they are de-scanned and pass through the longpass dichroic mirror 234 to be sent into the depth separation cycle using turning mirror 248 and lens doublet 250. The image planes are formed at the surface of the D-shaped mirror 222 and reflected into the depth separation cycle. The combination of lens doublets 254, 256 and mirrors 258, 260 form a linear reflector/oscillator for the separation cycle.

The slight lateral offset causes the image planes to form at the negative offset in the return path using lens doublet 254, where the image planes are picked off using a knife-edge mirror 262 one at a time as the travel through the cycle. The right side of the cycle ensures that the image planes are laterally and axially readjusted to beam laterally displaced onto the knife-edge mirror. The image planes are reflected towards lens doublet 264, a re-rescan Galvo 266, and subsequently through lens doublet 268 to form the re-scanned image planes at the sensor 270 (e.g., sCMOS sensor).

It will be appreciated that the illumination configuration described above can be viewed as a "unit" or "module" and can be used with other imaging configurations. Furthermore, the imaging configuration described above can be viewed as a "unit" or "module" and can be used with other illumination configurations. Additionally, the components, types, dimensions and other parameters described above are by way of example and not of limitation.

Figure 6:
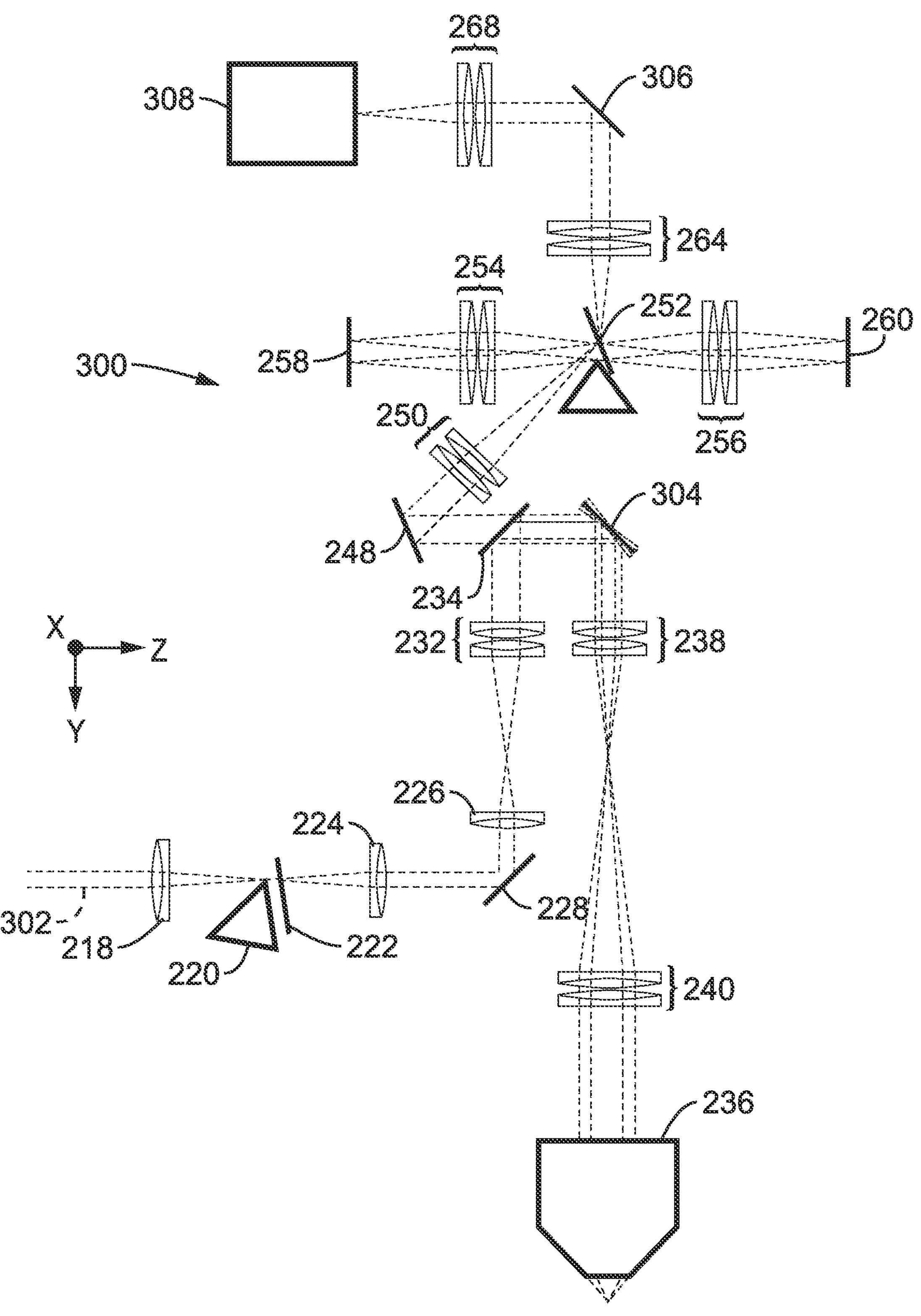
FIG. 6 is a schematic diagram of a variation of the transverse sheet illumination microscope of FIG. 4 where illumination is from a single two-photon beam according to the presented technology.
Figure 7:
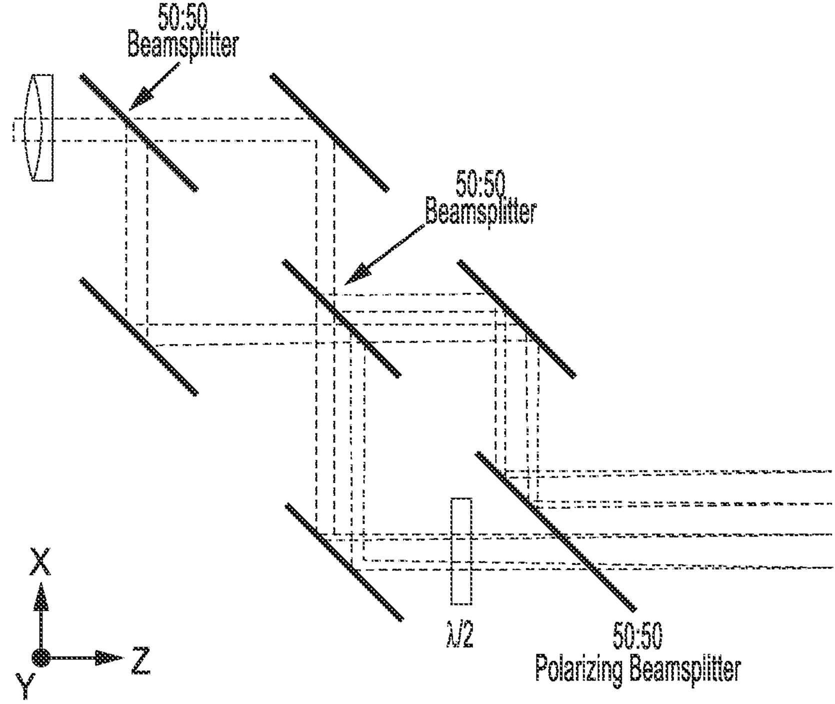
FIG. 7 is a schematic diagram showing laterally multiplexing two-photon beams as an alternative to the single two-photon beam of FIG. 6 according to the presented technology.

FIG. 6 schematically illustrates an embodiment 300 of TranSIM that is similar to the embodiment of FIG. 4 but has been adapted for illumination by a single two-photon (2P) beam 302. Here, scan Galvo 230 is replaced with an XY scan Galvo 304, re-scan Galvo 266 is replaced with an XY scan Galvo or a turn mirror 306, and sensor 270 is replaced with a sensor 308 that is a 1/8/32 channel linear PMT or 2D sCMOS sensor. FIG. 7 illustrates that multiple two-photon beams can be created to scan each plane in parallel using lateral multiplexing. Those planes can then be mapped onto linear photomultiplier linear arrays or 2D sensors.

Figure 8:
FIG. 8 illustrates examples of synchronization waveforms for transverse sheet illumination microscopy according to the presented technology.
Figure 8:
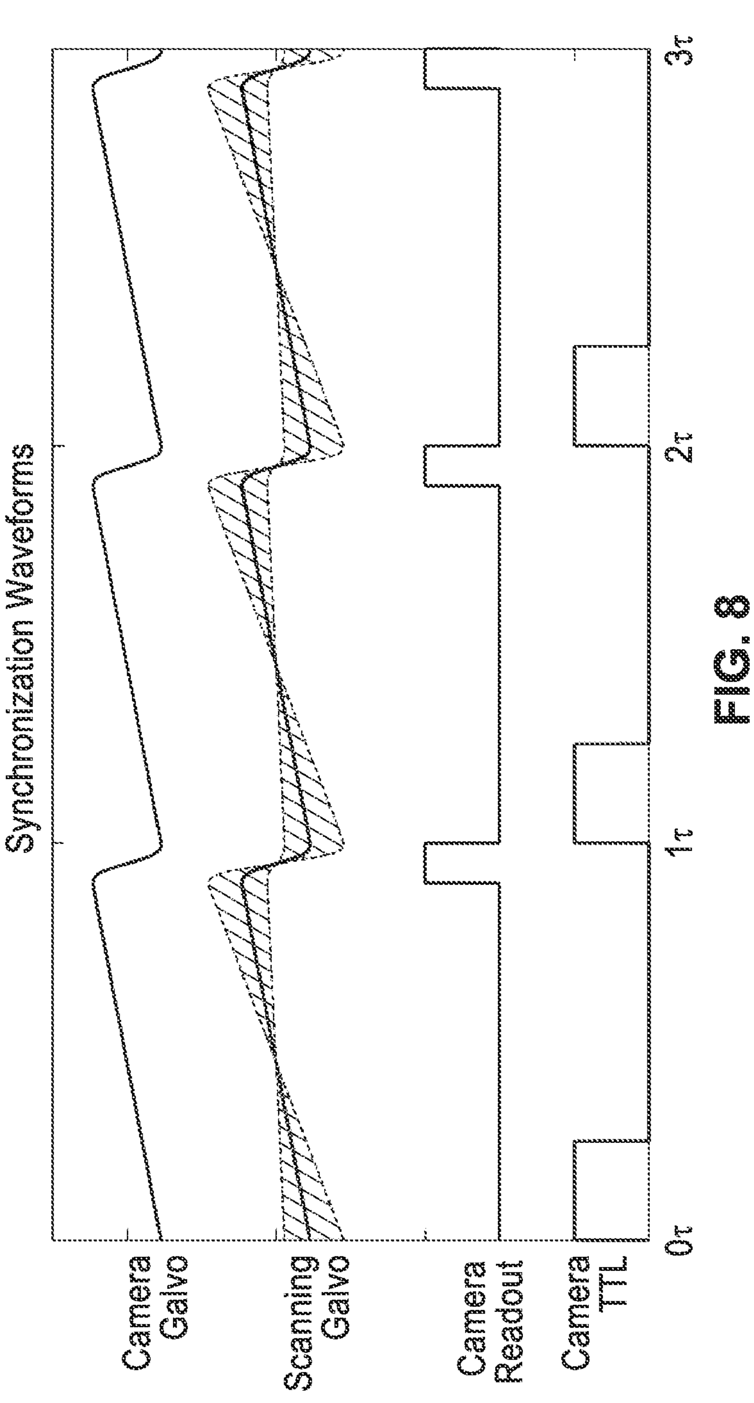

FIG. 8 shows sample synchronization waveforms 400 where three Hamamatsu Flash 4.0 V2s are synchronized by a parallel TTL signal. As can be seen, the field scanning galvanometer has a smoothed out sawtooth waveform. On the reset travel time, the camera's undergo readout. The image field is de-scanned due to the backward propagation through the detection arm onto the scanning galvo. After plane rearrangement, the image planes are rescanning using the camera located galvanometers. TranSIM allows for one-dimensional spatiotemporal compression (similar to point confocal systems whereby the scan range determines the magnification) by expanding or contracting the amplitude of the scanning galvo while maintaining the camera galvo-camera line-scanning matched. Lower and upper boundaries denoted by dashed lines correspond to 0.25× and 2× magnification, respectively, for demonstrative purposes.

Figure 9:
FIG. 9 illustrates examples of detailed synchronization waveform regions for transverse sheet illumination microscopy according to the presented technology.
Figure 9:
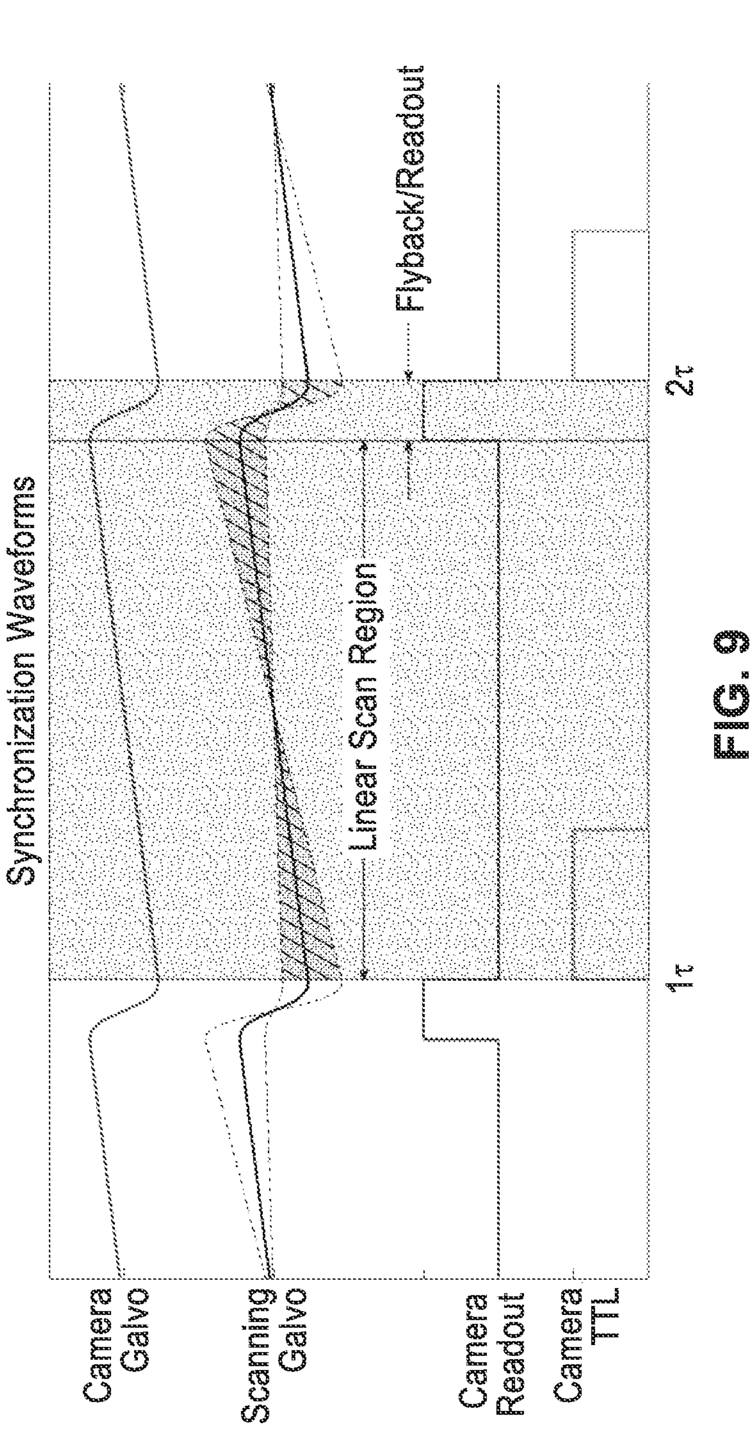

FIG. 9 shows detailed synchronization waveform regions 500. The period begins with the camera being externally start triggered to light-sheet scanning such that it coincides with the linear scan region of the galvanometers. After completing the scan, the camera reads out to the data acquisition computer via a camera link frame grabber and the galvanometers are reset. This reset process incorporates the flyback process and acceleration back produce a linear scan region for the subsequent period.

Figure 10:
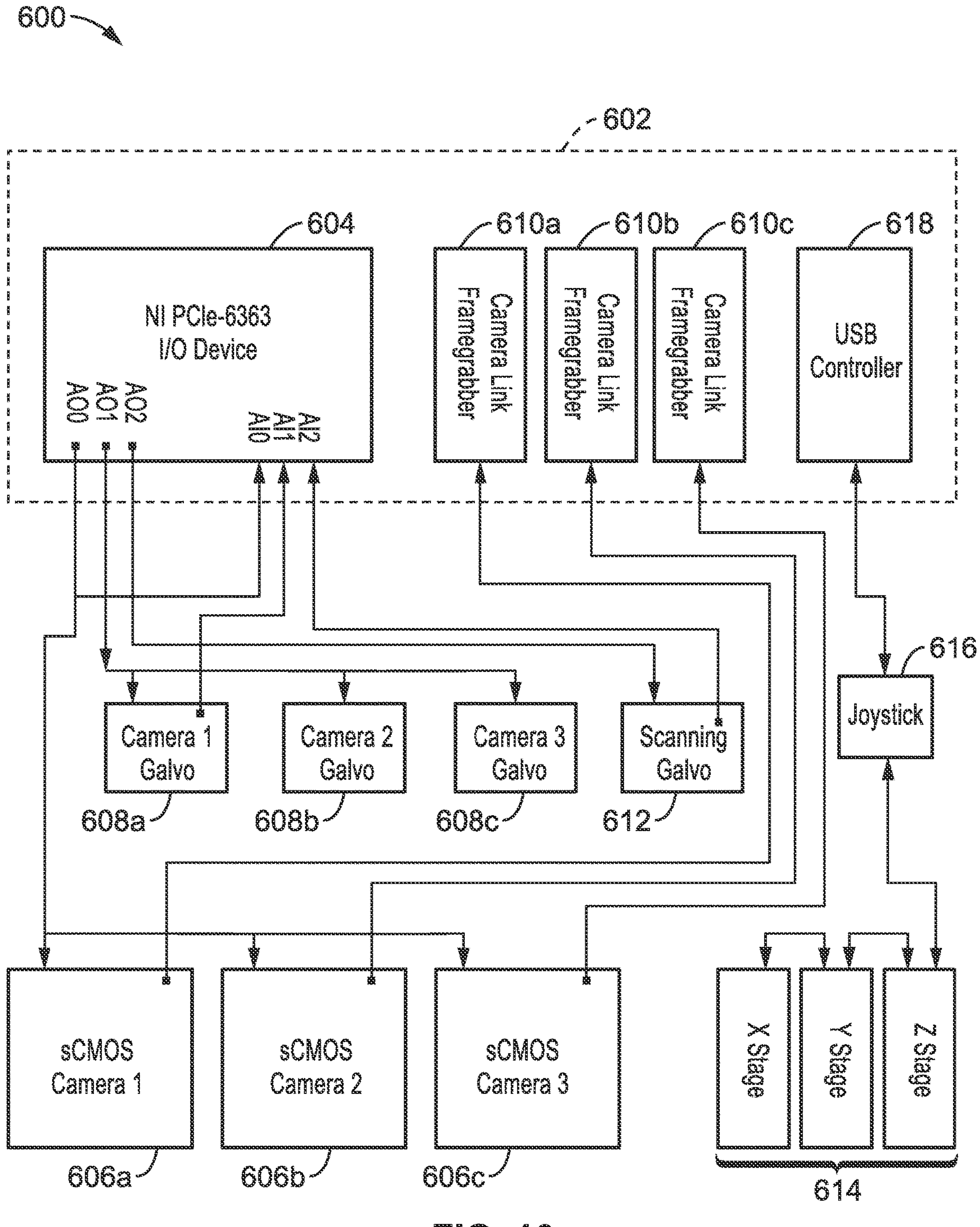
FIG. 10 is a diagram of an embodiment of a control configuration for a three-camera transverse sheet illumination microscope according to the presented technology.

FIG. 10 is a wiring diagram 600 illustrating a control configuration for a three-camera TranSIM microscope. It will be appreciated that the configuration shown can readily be adapted to controlling any number of cameras.

In the configuration of FIG. 10, a controller 602 is used to control the TranSIM microscope. In the embodiment illustrated, a control signal is created by a multifunction I/O device 604 (e.g., NI PCIe-6363) and sent to the sCMOS cameras 606*a*, 606*b*, 606*c*. In this example, the I/O device 604 sends a TTL signal through output line AO0 to three Hamamatsu Flash 4.0 V2s (not shown) in parallel which in turn provide external start trigger signals to the cameras. The external start triggers activate the rolling shutters (light-sheet mode) of the sCMOS cameras which are synchronized with the scan and rescan Galvos 608*a*, 608*b*, 608*c* at the end of the flyback and acceleration stages of the mirrors. The resulting image is captured via three framegrabbers 610*a*, 610*b*, 610*c* such as FireBird Camera Link Frame Grabbers (1×CLD-2PE8). Output line AO2 controls the field scanning galvanometer 612 with variable amplitude. Output line AO1 sends rescan signals to three Galvos 608*a*, 608*b*, 608*c* immediately before to the cameras.

A three-dimensional motorized X-Y-Z stage 614 is connected in series for each dimension along with a joystick 616 connected to a computer (not shown) via a USB controller 618 for software control. For monitoring purposes, one of the camera galvos, the scanning galvo, and the TTL signal sent to the cameras are monitored in parallel via the analog inputs (AI0-AI2) of the I/O device 604 and a four channel oscilloscope (not shown).

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A transverse sheet illumination microscopy apparatus, comprising: (a) an illumination unit configured to generate multiplexed beams of light for illuminating a sample; (b) wherein the illumination unit is configured to illuminate multiple planes by spatially separating multiple beams in depth (Z) and laterally (Y), whereby the planes can be separated; (c) an imaging unit configured to image fluorescence from a sample in response to illumination of the sample by said beams of light; (d) the imaging unit comprising a linear reflection cavity with an imaging sensor; (e) wherein the imaging unit is configured to select one plane at a time from a plurality of image planes from the sample and remap the selected plane to the imaging sensor; and (f) wherein each round trip in the linear reflection cavity allows for an additional plane to be segmented and re-adjusted onto the imaging sensor for imaging the sample.

The apparatus of any preceding for following implementation, wherein multiple z-planes are imaged simultaneously.

The apparatus of any preceding for following implementation, wherein temporal resolution of the imaging unit is increased to the temporal resolution of a single plane.

The apparatus of any preceding or following implementation, wherein the illumination unit comprises: (a) a laser source, a polarizing beamsplitter, a waveplate, a Fresnel biprism, a separation adjustment mirror, a plano-concave cylindrical lens, a turning mirror, a condensing mirror, a depth mirror, a multiplexing beamsplitter, a relay and condensing unit comprising a pair of plano-convex cylindrical lenses and a turning mirror, and a telecentric lens; (b) wherein the laser source emits a vertically polarized beam of light; (c) wherein the polarizing beamsplitter reflects the beam of light toward the waveplate which circularly polarizes the beam of light; (d) wherein the circularly polarized beam of light passes through the Fresnel biprism which splits the beam into two parallel beams of light; (e) wherein the parallel beams of light impinge on the separation adjustment mirror which in turn adjusts separation between the parallel beams of light and directs them to the Fresnel biprism and to the waveplate, wherein the waveplate linearly polarizes the beams in a horizontal manner which allows the beams to pass through the polarizing beamsplitter; (f) wherein the plano-concave cylindrical lens expands the linearly polarized beams in the x-dimension; (g) wherein the turning mirror redirects the path of the linearly polarized beams toward the condensing lens; (h) wherein the condensing lens focuses the linearly polarized beams to a line at the depth mirror and the multiplexing beamsplitter where the beams are multiplexed repeatedly, each new beam being laterally and axially displaced as a function of angle of incidence on the depth mirror; and (i) wherein multiplexed beams are relayed and condensed by the relay and condensing unit and directed to the telecentric lens for further relaying to a dichroic mirror and scanning galvanometer.

The apparatus of any preceding or following implementation, wherein the imaging unit comprises: (a) a longpass dichroic mirror, a scanning galvanometer, an objective, a scan lens, a tube lens, a turning mirror, a first lens doublet, a D-shaped mirror, a second lens doublet, a third lens doublet, a first mirror associated with the second lens doublet, a second mirror associated with the third lens doublet, a knife-edge mirror, fourth lens doublet, a rescanning galvanometer, a fifth lens doublet, and an imaging sensor; (b) wherein the multiplexed beams are relayed to the scanning galvanometer using the telecentric lens and the longpass dichroic mirror; (c) wherein the multiplexed beams are scanned by the galvanometer and relayed to the back focal plane of the objective using the scan lens and tube lens for magnification; (d) wherein the multiplexed beams are scanned at the back focal plane for illumination of the sample in discrete line scanned planes; (e) wherein fluorescence from the sample returns through the objective, the tube lens, and the scan lens, where it is de-scanned and passes through the longpass dichroic mirror, and is sent into a depth separation cycle using the turning mirror and the first lens doublet; (f) wherein image planes are formed at the surface of the D-shaped mirror and reflected into a depth separation cycle; (g) wherein the depth separation cycle is established by the second lens doublet, the third lens doublet, the first mirror and the second mirror; (h) wherein a lateral offset causes image planes to form at a negative offset in a return path using the second lens doublet and first mirror wherein the image planes are picked off by the knife-edge mirror one at a time as they travel through the depth separation cycle; (i) wherein third doublet lens and second mirror ensure that the image planes are laterally and axially readjusted to be laterally displaced onto the knife-edge mirror; and (j) wherein the image planes are reflected toward the fourth lens doublet, the rescanning galvanometer, and subsequently through the fifth lens doublet to form rescanned image planes at the imaging sensor.

A transverse sheet illumination microscopy apparatus, comprising: (a) an illumination unit configured to generate multiplexed beams of light for illuminating a sample; (b) wherein the illumination unit is configured to illuminate multiple planes by spatially separating multiple beams in depth (Z) and laterally (Y), whereby the planes can be separated; (c) an imaging unit configured to image fluorescence from a sample in response to illumination of the sample by said beams of light; (d) the imaging unit comprising a linear reflection cavity with an imaging sensor; (e) wherein the imaging unit is configured to select one plane at a time from a plurality of image planes from the sample and remap the selected plane to the imaging sensor; (f) wherein each round trip in the linear reflection cavity allows for an additional plane to be segmented and re-adjusted onto the imaging sensor for imaging the sample; (g) wherein the illumination unit comprises: (g)(i) a laser source, a polarizing beamsplitter, a waveplate, a Fresnel biprism, a separation adjustment mirror, a plano-concave cylindrical lens, a turning mirror, a condensing mirror, a depth mirror, a multiplexing beamsplitter, a relay and condensing unit comprising a pair of plano-convex cylindrical lenses and a turning mirror, and a telecentric lens; (g)(ii) wherein the laser source emits a vertically polarized beam of light; (g)(iii) wherein the polarizing beamsplitter reflects the beam of light toward the waveplate which circularly polarizes the beam of light; (g)(iv) wherein the circularly polarized beam of light passes through the Fresnel biprism which splits the beam into two parallel beams of light; (g)(v) wherein the parallel beams of light impinge on the separation adjustment mirror which in turn adjusts separation between the parallel beams of light and directs them to the Fresnel biprism and to the waveplate, wherein the waveplate linearly polarizes the beams in a horizontal manner which allows the beams to pass through the polarizing beamsplitter; (g)(vi) wherein the plano-concave cylindrical lens expands the linearly polarized beams in the x-dimension; (g)(vii) wherein the turning mirror redirects the path of the linearly polarized beams toward the condensing lens; (g)(viii) wherein the condensing lens focuses the linearly polarized beams to a line at the depth mirror and the multiplexing beamsplitter where the beams are multiplexed repeatedly, each new beam being laterally and axially displaced as a function of angle of incidence on the depth mirror; and (g)(ix) wherein multiplexed beams are relayed and condensed by the relay and condensing unit and directed to the telecentric lens for further relaying to a dichroic mirror and scanning galvanometer; and (h) wherein the imaging unit comprises: (h)(i) a longpass dichroic mirror, a scanning galvanometer, an objective, a scan lens, a tube lens, a turning mirror, a first lens doublet, a D-shaped mirror, a second lens doublet, a third lens doublet, a first mirror associated with the second lens doublet, a second mirror associated with the third lens doublet, a knife-edge mirror, fourth lens doublet, a rescanning galvanometer, a fifth lens doublet, and an imaging sensor; (h)(ii) wherein the multiplexed beams are relayed to the scanning galvanometer using the telecentric lens and the longpass dichroic mirror; (h)(iii) wherein the multiplexed beams are scanned by the galvanometer and relayed to the back focal plane of the objective using the scan lens and tube lens for magnification; (h)(iv) wherein the multiplexed beams are scanned at the back focal plane for illumination of the sample in discrete line scanned planes; (h)(v) wherein fluorescence from the sample returns through the objective, the tube lens, and the scan lens, where it is de-scanned and passes through the longpass dichroic mirror, and is sent into a depth separation cycle using the turning mirror and the first lens doublet; (h)(vi) wherein image planes are formed at the surface of the D-shaped mirror and reflected into a depth separation cycle; (h)(vii) wherein the depth separation cycle is established by the second lens doublet, the third lens doublet, the first mirror and the second mirror; (h)(viii) wherein a lateral offset causes image planes to form at a negative offset in a return path using the second lens doublet and first mirror wherein the image planes are picked off by the knife-edge mirror one at a time as they travel through the depth separation cycle; (h)(ix) wherein third doublet lens and second mirror ensure that the image planes are laterally and axially readjusted to be laterally displaced onto the knife-edge mirror; and (h)(x) wherein the image planes are reflected toward the fourth lens doublet, the rescanning galvanometer, and subsequently through the fifth lens doublet to form re-scanned image planes at the imaging sensor.

An axially illuminated microscope for multiple plane imaging configured to achieve simultaneous imaging of multiple z-planes in laser scanning confocal fluorescence microscopy.

An improved laser scanning confocal fluorescence microscope, the improvement comprising configuring said microscope with axial illumination for multiple plane imaging that achieves simultaneous imaging of multiple z-planes.

In a laser scanning confocal microscope, an improvement comprising: (a) configuring the microscope for illuminating several planes by spatially separating multiple beams of light in depth (Z) and laterally (Y); and (b) separating the planes by selecting one plane a time and remapping the separated planes to be adjacent and in the same place on focus on a single sensor; and wherein temporal resolution of the confocal microscope is increased to the temporal resolution of a single plane.

A transverse sheet illumination microscopy apparatus, comprising: (a) an illumination unit configured to generate multiplexed beams of light for illuminating a sample; (b) wherein the illumination unit is configured to illuminate multiple planes by spatially separating multiple beams in depth (Z) and laterally (Y), whereby the planes can be separated; (c) an imaging unit configured to image fluorescence from a sample in response to illumination of the sample by said beams of light; (d) the imaging unit comprising one or more plane separating units configured to separate planes and remap the separated planes to associated imaging sensors; and (e) wherein the plane separating units are configured to select one plane at a time and remap the plane to an imaging sensor.

A transverse sheet illumination microscopy apparatus, comprising: (a) an illumination unit configured to generate multiplexed beams of light for illuminating a sample; (b) wherein the illumination unit is configured to illuminate multiple planes by spatially separating multiple beams in depth (Z) and laterally (Y), whereby the planes can be separated; (c) an imaging unit configured to image fluorescence from a sample in response to illumination of the sample by said beams of light; (d) the imaging unit comprising one or more plane separating units configured to select one plane at a time and remap the plane to an associated imaging sensor; (e) wherein each said plane separating unit comprises a knife edge mirror and associated scan galvanometer.

A transverse sheet illumination microscopy imaging unit for imaging fluorescence from a sample in response to illumination of the sample by multiplexed beams of light, the imaging unit comprising: (a) an imaging sensor; and (b) a plane separating unit configured to select one plane at a time from a plurality of image planes from the sample and remap the selected plane to the imaging sensor.

A transverse sheet illumination microscopy imaging unit for imaging fluorescence from a sample in response to illumination of the sample by multiplexed beams of light, the imaging unit comprising: (a) a linear reflection cavity with an imaging sensor; (b) wherein the linear reflection cavity is configured to select one plane at a time from a plurality of image planes from the sample and remap the selected plane to the imaging sensor; and (c) wherein each round trip in the linear reflection cavity allows for an additional plane to be segmented and re-adjusted onto the imaging sensor for imaging the sample.

A transverse sheet illumination microscopy imaging unit for imaging fluorescence from a sample in response to illumination of the sample by multiplexed beams of light, the imaging unit comprising, the imaging unit comprising: (a) a longpass dichroic mirror, a scanning galvanometer, an objective, a scan lens, a tube lens, a turning mirror, a first lens doublet, a D-shaped mirror, a second lens doublet, a third lens doublet, a first mirror associated with the second lens doublet, a second mirror associated with the third lens doublet, a knife-edge mirror, fourth lens doublet, a rescanning galvanometer, a fifth lens doublet, and an imaging sensor; (b) wherein the multiplexed beams are relayed to the scanning galvanometer using the telecentric lens and the longpass dichroic mirror; (c) wherein the multiplexed beams are scanned by the galvanometer and relayed to the back focal plane of the objective using the scan lens and tube lens for magnification; (d) wherein the multiplexed beams are scanned at the back focal plane for illumination of the sample in discrete line scanned planes; (e) wherein fluorescence from the sample returns through the objective, the tube lens, and the scan lens, where it is de-scanned and passes through the longpass dichroic mirror, and is sent into a depth separation cycle using the turning mirror and the first lens doublet; (f) wherein image planes are formed at the surface of the D-shaped mirror and reflected into a depth separation cycle; (g) wherein the depth separation cycle is established by the second lens doublet, the third lens doublet, the first mirror and the second mirror; (h) wherein a lateral offset causes image planes to form at a negative offset in a return path using the second lens doublet and first mirror wherein the image planes are picked off by the knife-edge mirror one at a time as they travel through the depth separation cycle; (i) wherein third doublet lens and second mirror ensure that the image planes are laterally and axially readjusted to be laterally displaced onto the knife-edge mirror; and (j) wherein the image planes are reflected toward the fourth lens doublet, the rescanning galvanometer, and subsequently through the fifth lens doublet to form re-scanned image planes at the imaging sensor.

An illumination unit for transverse sheet illumination microscopy, the illumination unit comprising: (a) an illumination source; (b) a beam multiplexing unit configured to generate multiplexed beams of light from the illumination source for illuminating a sample; (c) wherein the illumination unit is configured to illuminate multiple planes by spatially separating multiple beams in depth (Z) and laterally (Y), whereby the planes can be separated.

An illumination unit for transverse sheet illumination microscopy, the illumination unit comprising, the illumination unit comprising: (a) a laser source, a polarizing beamsplitter, a waveplate, a Fresnel biprism, a separation adjustment mirror, a plano-concave cylindrical lens, a turning mirror, a condensing mirror, a depth mirror, a multiplexing beamsplitter, a relay and condensing unit comprising a pair of plano-convex cylindrical lenses and a turning mirror, and a telecentric lens; (b) wherein the laser source emits a vertically polarized beam of light; (c) wherein the polarizing beamsplitter reflects the beam of light toward the waveplate which circularly polarizes the beam of light; (d) wherein the circularly polarized beam of light passes through the Fresnel biprism which splits the beam into two parallel beams of light; (e) wherein the parallel beams of light impinge on the separation adjustment mirror which in turn adjusts separation between the parallel beams of light and directs them to the Fresnel biprism and to the waveplate, wherein the waveplate linearly polarizes the beams in a horizontal manner which allows the beams to pass through the polarizing beamsplitter; (f) wherein the plano-concave cylindrical lens expands the linearly polarized beams in the x-dimension; (g) wherein the turning mirror redirects the path of the linearly polarized beams toward the condensing lens; (h) wherein the condensing lens focuses the linearly polarized beams to a line at the depth mirror and the multiplexing beamsplitter where the beams are multiplexed repeatedly, each new beam being laterally and axially displaced as a function of angle of incidence on the depth mirror; and (i) wherein multiplexed beams are relayed and condensed by the relay and condensing unit and directed to the telecentric lens.

As used herein, term “implementation” is intended to include, without limitation, embodiments, examples, or other forms of practicing the technology described herein.

As used herein, the singular terms “a,” “an,” and “the” may include plural referents unless the context clearly dictates otherwise. Reference to an object in the singular is not intended to mean “one and only one” unless explicitly so stated, but rather “one or more.”

Phrasing constructs, such as “A, B and/or C”, within the present disclosure describe where either A, B, or C can be present, or any combination of items A, B and C. Phrasing constructs indicating, such as “at least one of” followed by listing a group of elements, indicates that at least one of these group elements is present, which includes any possible combination of the listed elements as applicable.

References in this disclosure referring to “an embodiment”, “at least one embodiment” or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term “set” refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A transverse sheet illumination microscopy apparatus, comprising:

(a) an illumination unit configured to generate multiplexed beams of light for illuminating a sample;

(b) wherein the illumination unit is configured to illuminate multiple planes by spatially separating multiple beams in depth (Z) and laterally (Y), whereby the planes can be separated;

(c) an imaging unit configured to image fluorescence from a sample in response to illumination of the sample by said beams of light;

(d) the imaging unit comprising a linear reflection cavity with an imaging sensor;

(e) wherein the imaging unit is configured to select one plane at a time from a plurality of image planes from the sample and remap the selected plane to the imaging sensor; and (f) wherein each round trip in the linear reflection cavity allows for an additional plane to be segmented and re-adjusted onto the imaging sensor for imaging the sample.

2. The apparatus of claim 1, wherein multiple z-planes are imaged simultaneously.

3. The apparatus of claim 1, wherein temporal resolution of the imaging unit is increased to the temporal resolution of a single plane.

4. The apparatus of claim 1, wherein the illumination unit comprises:

(a) a laser source, a polarizing beamsplitter, a waveplate, a Fresnel biprism, a separation adjustment mirror, a plano-concave cylindrical lens, a turning mirror, a condensing mirror, a depth mirror, a multiplexing beamsplitter, a relay and condensing unit comprising a pair of plano-convex cylindrical lenses and a turning mirror, and a telecentric lens;

(b) wherein the laser source emits a vertically polarized beam of light;

(c) wherein the polarizing beamsplitter reflects the beam of light toward the waveplate which circularly polarizes the beam of light;

(d) wherein the circularly polarized beam of light passes through the Fresnel biprism which splits the beam into two parallel beams of light;

(e) wherein the parallel beams of light impinge on the separation adjustment mirror which in turn adjusts separation between the parallel beams of light and directs them to the Fresnel biprism and to the waveplate, wherein the waveplate linearly polarizes the beams in a horizontal manner which allows the beams to pass through the polarizing beamsplitter;

(f) wherein the plano-concave cylindrical lens expands the linearly polarized beams in the x-dimension;

(g) wherein the turning mirror redirects the path of the linearly polarized beams toward the condensing lens;

(h) wherein the condensing lens focuses the linearly polarized beams to a line at the depth mirror and the multiplexing beamsplitter where the beams are multiplexed repeatedly, each new beam being laterally and axially displaced as a function of angle of incidence on the depth mirror; and (i) wherein multiplexed beams are relayed and condensed by the relay and condensing unit and directed to the telecentric lens for further relaying to a dichroic mirror and scanning galvanometer.

5. The apparatus of claim 1, wherein the imaging unit comprises:

(a) a longpass dichroic mirror, a scanning galvanometer, an objective, a scan lens, a tube lens, a turning mirror, a first lens doublet, a D-shaped mirror, a second lens doublet, a third lens doublet, a first mirror associated with the second lens doublet, a second mirror associated with the third lens doublet, a knife-edge mirror, fourth lens doublet, a rescanning galvanometer, a fifth lens doublet, and an imaging sensor;

(b) wherein the multiplexed beams are relayed to the scanning galvanometer using the telecentric lens and the longpass dichroic mirror;

(c) wherein the multiplexed beams are scanned by the galvanometer and relayed to the back focal plane of the objective using the scan lens and tube lens for magnification;

(d) wherein the multiplexed beams are scanned at the back focal plane for illumination of the sample in discrete line scanned planes;

(e) wherein fluorescence from the sample returns through the objective, the tube lens, and the scan lens, where it is de-scanned and passes through the longpass dichroic mirror, and is sent into a depth separation cycle using the turning mirror and the first lens doublet;

(f) wherein image planes are formed at the surface of the D-shaped mirror and reflected into a depth separation cycle;

(g) wherein the depth separation cycle is established by the second lens doublet, the third lens doublet, the first mirror and the second mirror;

(h) wherein a lateral offset causes image planes to form at a negative offset in a return path using the second lens doublet and first mirror wherein the image planes are picked off by the knife-edge mirror one at a time as they travel through the depth separation cycle;

(i) wherein third doublet lens and second mirror ensure that the image planes are laterally and axially readjusted to be laterally displaced onto the knife-edge mirror; and (j) wherein the image planes are reflected toward the fourth lens doublet, the rescanning galvanometer, and subsequently through the fifth lens doublet to form re-scanned image planes at the imaging sensor.

6. The apparatus of claim 1, wherein the illumination unit comprises:

(a) a laser source, a polarizing beamsplitter, a waveplate, a Fresnel biprism, a separation adjustment mirror, a plano-concave cylindrical lens, a turning mirror, a condensing mirror, a depth mirror, a multiplexing beamsplitter, a relay and condensing unit comprising a pair of plano-convex cylindrical lenses and a turning mirror, and a telecentric lens;

(b) wherein the laser source emits a vertically polarized beam of light;

(c) wherein the polarizing beamsplitter reflects the beam of light toward the waveplate which circularly polarizes the beam of light;

(d) wherein the circularly polarized beam of light passes through the Fresnel biprism which splits the beam into two parallel beams of light;

(a) wherein the parallel beams of light impinge on the separation adjustment mirror which in turn adjusts separation between the parallel beams of light and directs them to the Fresnel biprism and to the waveplate, wherein the waveplate linearly polarizes the beams in a horizontal manner which allows the beams to pass through the polarizing beamsplitter;

(e) wherein the plano-concave cylindrical lens expands the linearly polarized beams in the x-dimension;

(f) wherein the turning mirror redirects the path of the linearly polarized beams toward the condensing lens;

(g) wherein the condensing lens focuses the linearly polarized beams to a line at the depth mirror and the multiplexing beamsplitter where the beams are multiplexed repeatedly, each new beam being laterally and axially displaced as a function of angle of incidence on the depth mirror; and (h) wherein multiplexed beams are relayed and condensed by the relay and condensing unit and directed to the telecentric lens for further relaying to a dichroic mirror and scanning galvanometer; and wherein the imaging unit comprises:

(a) a longpass dichroic mirror, a scanning galvanometer, an objective, a scan lens, a tube lens, a turning mirror, a first lens doublet, a D-shaped mirror, a second lens doublet, a third lens doublet, a first mirror associated with the second lens doublet, a second mirror associated with the third lens doublet, a knife-edge mirror, fourth lens doublet, a rescanning galvanometer, a fifth lens doublet, and an imaging sensor;

(b) wherein the multiplexed beams are relayed to the scanning galvanometer using the telecentric lens and the longpass dichroic mirror;

(c) wherein the multiplexed beams are scanned by the galvanometer and relayed to the back focal plane of the objective using the scan lens and tube lens for magnification;

(d) wherein the multiplexed beams are scanned at the back focal plane for illumination of the sample in discrete line scanned planes;

(e) wherein fluorescence from the sample returns through the objective, the tube lens, and the scan lens, where it is de-scanned and passes through the longpass dichroic mirror, and is sent into a depth separation cycle using the turning mirror and the first lens doublet;

(f) wherein image planes are formed at the surface of the D-shaped mirror and reflected into a depth separation cycle;

(g) wherein the depth separation cycle is established by the second lens doublet, the third lens doublet, the first mirror and the second mirror;

(h) wherein a lateral offset causes image planes to form at a negative offset in a return path using the second lens doublet and first mirror wherein the image planes are picked off by the knife-edge mirror one at a time as they travel through the depth separation cycle;

(ix) (i) wherein third doublet lens and second mirror ensure that the image planes are laterally and axially readjusted to be laterally displaced onto the knife-edge mirror; and (j) wherein the image planes are reflected toward the fourth lens doublet, the rescanning galvanometer, and subsequently through the fifth lens doublet to form re-scanned image planes at the imaging sensor.

7. The apparatus of claim 1, wherein the imaging unit comprises:

(a) the imaging unit comprising one or more plane separating units configured to separate planes and remap the separated planes to associated imaging sensors; and (b) wherein the plane separating units are configured to select one plane at a time and remap the plane to an imaging sensor.

8. The apparatus of claim 1, wherein the imaging unit further comprises:

(a) the imaging unit comprising one or more plane separating units configured to select one plane at a time and remap the plane to an associated imaging sensor;

(b) wherein each said plane separating unit comprises a knife edge mirror and associated scan galvanometer.

9. The apparatus of claim 1, wherein the linear reflection cavity is configured to select one plane at a time from a plurality of image planes from the sample and remap the selected plane to the imaging sensor; and wherein each round trip in the linear reflection cavity allows for an additional plane to be segmented and re-adjusted onto the imaging sensor for imaging the sample.

10. The apparatus of claim 1, the imaging unit comprising:

(a) a longpass dichroic mirror, a scanning galvanometer, an objective, a scan lens, a tube lens, a turning mirror, a first lens doublet, a D-shaped mirror, a second lens doublet, a third lens doublet, a first mirror associated with the second lens doublet, a second mirror associated with the third lens doublet, a knife-edge mirror, fourth lens doublet, a rescanning galvanometer, a fifth lens doublet, and an imaging sensor;

(b) wherein the multiplexed beams are relayed to the scanning galvanometer using the telecentric lens and the longpass dichroic mirror;

(c) wherein the multiplexed beams are scanned by the galvanometer and relayed to the back focal plane of the objective using the scan lens and tube lens for magnification;

(d) wherein the multiplexed beams are scanned at the back focal plane for illumination of the sample in discrete line scanned planes;

(e) wherein fluorescence from the sample returns through the objective, the tube lens, and the scan lens, where it is de-scanned and passes through the longpass dichroic mirror, and is sent into a depth separation cycle using the turning mirror and the first lens doublet;

(f) wherein image planes are formed at the surface of the D-shaped mirror and reflected into a depth separation cycle;

(g) wherein the depth separation cycle is established by the second lens doublet, the third lens doublet, the first mirror and the second mirror;

(h) wherein a lateral offset causes image planes to form at a negative offset in a return path using the second lens doublet and first mirror wherein the image planes are picked off by the knife-edge mirror one at a time as they travel through the depth separation cycle;

(i) wherein third doublet lens and second mirror ensure that the image planes are laterally and axially readjusted to be laterally displaced onto the knife-edge mirror; and (j) wherein the image planes are reflected toward the fourth lens doublet, the rescanning galvanometer, and subsequently through the fifth lens doublet to form re-scanned image planes at the imaging sensor.

11. The apparatus of claim 1, the illumination unit comprising:

(a) a laser source, a polarizing beamsplitter, a waveplate, a Fresnel biprism, a separation adjustment mirror, a plano-concave cylindrical lens, a turning mirror, a condensing mirror, a depth mirror, a multiplexing beamsplitter, a relay and condensing unit comprising a pair of plano-convex cylindrical lenses and a turning mirror, and a telecentric lens;

(b) wherein the laser source emits a vertically polarized beam of light;

(c) wherein the polarizing beamsplitter reflects the beam of light toward the waveplate which circularly polarizes the beam of light;

(d) wherein the circularly polarized beam of light passes through the Fresnel biprism which splits the beam into two parallel beams of light;

(e) wherein the parallel beams of light impinge on the separation adjustment mirror which in turn adjusts separation between the parallel beams of light and directs them to the Fresnel biprism and to the waveplate, wherein the waveplate linearly polarizes the beams in a horizontal manner which allows the beams to pass through the polarizing beamsplitter;

(f) wherein the plano-concave cylindrical lens expands the linearly polarized beams in the x-dimension;

(g) wherein the turning mirror redirects the path of the linearly polarized beams toward the condensing lens;

(h) wherein the condensing lens focuses the linearly polarized beams to a line at the depth mirror and the multiplexing beamsplitter where the beams are multiplexed repeatedly, each new beam being laterally and axially displaced as a function of angle of incidence on the depth mirror; and (i) wherein multiplexed beams are relayed and condensed by the relay and condensing unit and directed to the telecentric lens.

* * * * *